Feb. 9, 1937.                E. C. HILLMAN                2,070,049
                        TRAY MOVING DEVICE FOR OVENS
                           Filed Aug. 20, 1934        2 Sheets-Sheet 1

INVENTOR
                                                 Ernest C. Hillman
                                         BY
                                                        ATTORNEY Feb. 9, 1937.   E. C. HILLMAN   2,070,049
TRAY MOVING DEVICE FOR OVENS
Filed Aug. 20, 1934   2 Sheets-Sheet 2

INVENTOR
Ernest C. Hillman
BY
ATTORNEY

Patented Feb. 9, 1937

2,070,049

UNITED STATES PATENT OFFICE 2,070,049

TRAY MOVING DEVICE FOR OVENS

Ernest C. Hillman, Los Angeles, Calif., assignor, by direct and mesne assignments, to Hillman-Thorpe Company, a corporation of California Application August 20, 1934, Serial No. 740,725

6 Claims. (Cl. 126—339)

My invention relates to improvements in cooking stoves and it has especial reference to a means for raising and lowering the pan carriers within the cooking compartments of an oven and for automatically withdrawing the carriers from and returning same to within the oven.

The particular objects of the invention are to provide in association or combination with the cooking compartments of stoves, a series of carriers for pans or food which may be readily and quickly disposed within the proper heat area within the cooking compartments for the purpose of subjecting or exposing the food in the pans or on the carriers to the most effective or desired heat; to provide a simple means by which the object may be accomplished without liability to injury by contacting hot parts of the stove; to provide a simple contrivance for this purpose in which each pan carrier may be raised or lowered within the cooking compartment either simultaneously with or independently of others.

Further objects will appear from the following specification in connection with the accompanying drawings which are illustrative of a simple, effective and practical embodiment of the invention in a preferable form, and therein Fig. 1 is a perspective view showing my invention as applied in practice to a modern cook stove, one of the pan carriers being shown in elevated position within a cooking compartment, and all the carriers being shown withdrawn from the cooking compartment and the mechanism for effecting the withdrawal being shown in operated position.

Figure 1:
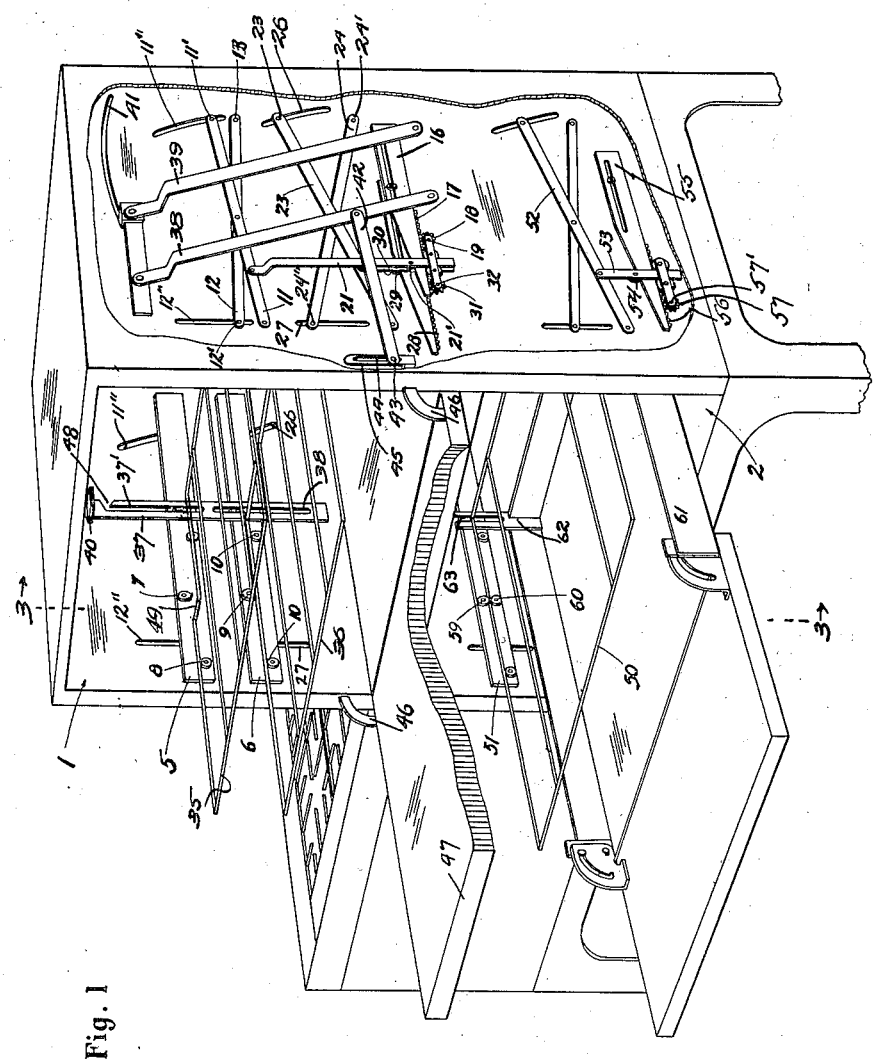

Specifically my invention is combinative with the cooking compartments of a stove, that is, the baking compartment 1 and the broiling compartment 2, to both of which the invention is applicable. Operable vertically within the baking compartment of the stove are a series of superposed supports 5 and 6, respectively, each support provided with upper and lower rollers 7 and 8 and 9 and 10 respectively. The supports 5 which are in the same horizontal plane within the oven, are pivotally connected to ends of centrally joined and pivoting levers 11 and 12 outside the oven. The other end of the lever 11 is pivotally secured in the wall of the oven compartment and the other end of the lever 12 is pivotally associated with and slidable relatively to the wall of the oven, the pin 13 for this purpose pivoting and traveling in a slot 14 provided in members or reinforcers 15 secured to the side wall of the oven, Fig. 2. The pivotal connection 11' which conjoins the end of the lever 11 with the support 5 at one side operates in an arcuate slot 11'' which penetrates the wall of the oven compartment and corresponds to the arc described by said lever as it is raised and lowered. The pivotal connection 12' which conjoins the lever 12 with the support 5 at the other side operates in a vertical slot 12'' which penetrates the wall of the oven compartment, the pivot pin 13 slidable in the member 15 secured to the wall of the oven compartment permitting this rectilinear movement as the said lever 12 is raised and lowered by the companion lever 11.

Figure 4:
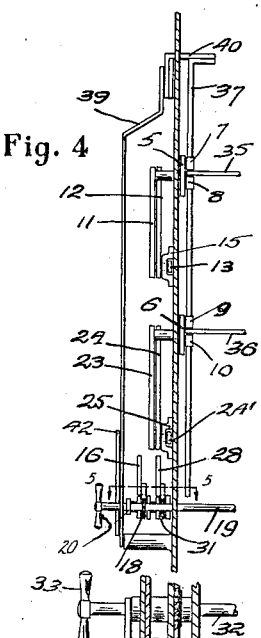
Fig. 4 is a fragmentary section on line 4—4 Fig. 2 showing the means for moving the pan or food carriers vertically.
Figure 5:
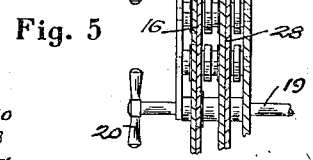
Fig. 5 is an enlarged fragmentary section on line 5—5 Fig. 4 showing the operating means for the elevators.
Figure 3:
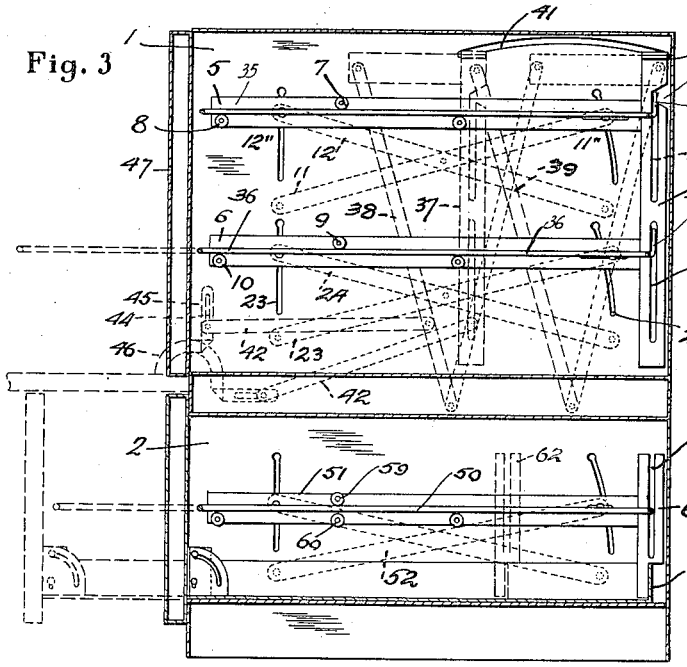
Fig. 3 is a section on line 3—3, Fig. 1.
Figure 6:
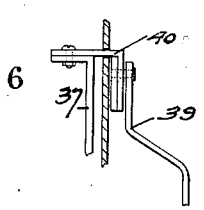
Fig. 6 is an enlarged fragmentary section on line 6—6 Fig. 2 showing operating assembly of mechanism for moving the grids or pan carriers out of and back into the oven.

Movement of the levers 11 and 12, to effect the movement of the supports 5 vertically relative to the oven compartment is accomplished by an inclined plane or wedge member 16 suitably supported on the side wall of the oven and provided with a rack 17. A pinion 18 is in engagement with said rack 17 and is mounted upon a shaft 19 that is provided with a hand wheel or lever 20 for rotating same, thereby to move said wedge member or inclined plane 16 horizontally with respect to the oven wall and the roller 21' of a bar 21 which is pivotally connected to the lever 11 near the point of pivotal connection of same with the oven wall. The roller 21' of the bar 21 is held in constant contact with said wedge members 16, by the weight of the levers 11 and 12, the supports 5 and the objects carried by the support, and hence as the member 16 is moved by operation of the hand wheel 20, Figs. 4 and 5, the bar 21 and consequently the levers 11 and 12 and their associated supports are elevated or lowered in positive manner and securely maintained in any position of adjustment within the oven.

Since the mechanism involved in elevating and lowering the pan or tray supports, as herein described, is duplicated on each side of the oven, but one series has been described and will be described hereinafter, and like numerals throughout the specification and drawings indicate like parts.

The supports 6 which are the lower ones within the oven 1 are pivotally connected to the ends of a pair of centrally joined pivoting levers 23 and 24 outside the oven. The other ends of said levers are pivotally secured on the oven wall, the pivot 24' of the lever 24 being horizontally movable in a slot 25' provided in a reinforce or member 25, Fig. 2, secured to the oven wall, during the elevation and lowering of the levers. The pivotal connection 23' which conjoins the end of the lever 23 with one side of the support 6 operates in an arcuate slot 26 which penetrates the wall of the oven compartment and corresponds to the arc described by said lever as it is raised and lowered. The pivotal connection 24'' which conjoins the lever 24 with the support 6 at the other end operates in a vertical slot 27 which penetrates the wall of the oven, the slidable pivot 24' permitting this rectilinear movement as the said lever is raised and lowered by the companion lever 23. Movement of the levers 23 and 24 to effect the vertical movement of said support 6 within the oven is controlled by a wedge member or inclined plane 28, upon the inclined surface of which rides a roller 29 that is journaled on a short arm 30 which is pivotally connected to the lever 23, Figs. 1 and 2. This wedge member 28 is suitably supported on the side wall of the oven and is provided with a rack 28' in mesh with which is a pinion 31 secured to a shaft 32. By means of a hand wheel or lever 33, Fig. 5, said shaft and pinion are rotated and the horizontal movement of said wedge member effected with the consequent elevation or lowering of the support 6 within the oven. The operation of the respective supports 5 and 6 is, as seen independently controllable by the independent operation of the wedge members 16 and 28.

The supports 5 and 6 respectively, carry pan or food carrying trays or grids 35 and 36 respectively, of design common in stoves, these trays or grids being vertically movable within the oven, with the supports as described. They are disposed as shown in Fig. 1, between the respective upper and lower rollers 7 and 8 and 9 and 10, which provide for them anti-friction surfaces. These grids or trays 35 and 36 are horizontally movable relative to the vertically movable supports 5 and 6, and I will now describe the means by which this is accomplished.

Figure 2:
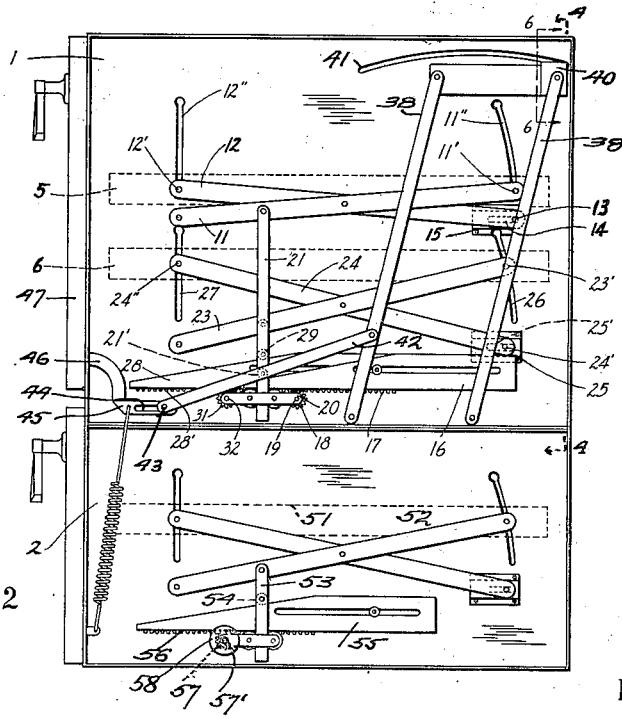
Fig. 2 is a side elevation of the cooking compartments of a stove with the means for operating the pan carriers horizontally relative to the compartment being shown in normal or inoperative position; the view also shows the operating means for elevating or lowering the carrier supports.
Figure 7:
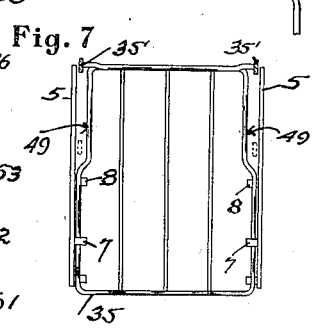
Fig. 7 is a plan view of one of the grids or pan carriers.

Each of the grids or pan carriers 35 and 36 is provided at the rear and on each side thereof with hooks 35' and 36' respectively. These hooks engage in vertical slots 37' and 38' provided in a vertical bar 37 that is joined to a pair of spaced levers 38 and 39 by a cross member 40 which extends through an arcuate slot 41 in the wall of the oven. The spaced levers 38 and 39 are pivotally mounted near the bottom and on the outside of the side wall of the oven, while the bar 37 is freely suspended from said cross member 40 and is movable within the oven substantially horizontally to withdraw the trays or pan carriers 35 and 36 from, or return same to, within the oven. The slots 37' and 38' in the vertical bar 37 permit the vertical movement of the trays 35 and 36 with the vertical movement of the supports 5 and 6, with relation to which the carriers 35 and 36 may be moved by said bar 37 in a horizontal direction. The levers 38 and 39 are actuable by a rod or link 42 which is pivotally connected at one end to the lever 38 near the bottom thereof. The other end of said link 42 is provided with a stud 43 which is operably disposed in the slotway 44 of an extension 45 that is integral with the quadrant 46 usually fixed to the oven door 47. The purpose of this connection is to provide a lost motion so that the door may be opened a determinate distance before the actual displacement of the grids occurs. The normal position of the connection 45 with the link 42 is shown in Fig. 2, in which view the slotway 44 is horizontal. Thus the actual pull of the extension 45 on the link 42 does not occur until the extension 45 has traversed a definite arcuate distance with the opening of the door 47, during which period the link 42 merely pivots in the slotway 44. The purpose of this provision is to facilitate inspection of the baking progress without necessarily opening the door sufficiently far to withdraw the tray or trays from the oven. This manner of providing a lost motion connection insures an immediate return travel of the trays to within the oven so soon as the door is moved to closing position from the full open position shown in Fig. 1. It is unnecessary at times to withdraw both grids 35 and 36 simultaneously with the opening of the door 47, and for this reason, the rear of the bar 37 is provided with a cut-out 48 which communicates with the vertical slot 37' at the top. When the upper grid 35 is elevated to uppermost position by the mechanism described, the hooks 35' thereof are brought into register with the cut-outs 48. As now the bar 37 is moved forward by the mechanism specified, it does so relatively to said upper grid, while the lower grid which is always connected to the bar 37 moves forward with it. The cut-out 48 in the bar 37 is provided for communication with the upper end of the slot 37' essentially to necessitate movement of the upper grid 35 to highest position within the oven, where it will be out of the way when not in use. Return of the grid 35 to connecting association with the bar 37 is accomplished by lowering the supports 5 a short distance so that the hooks thereof engage in the vertical slot 37' and below the cut-out 48 of the bar 37. The pan carrier 35 is provided laterally with offsets 49, Fig. 7, to enable the bars 37 to move relatively to said grid when said grid is to remain within the oven.

The means for moving the grid 50 and grid supports 51 in the broiler compartment of a stove is practically the same as those used in the oven compartment. The supports 51 are pivotally connected to one end of a pair of centrally joined and pivoting levers 52, the other ends of which are mounted on the side walls of the broiler compartment for pivotal movement. A rod 53 depends pivotally from one of said conjoined levers 52 and carries a roller or anti-friction member 54, which is arranged to be engaged by and ride upon an inclined plane or wedge 55 secured on the side wall of the oven for movement relatively thereto. The inclined plane 55 is provided with a rack 56 engaged by a pinion 57 on a shaft 57' which is operable by a hand wheel or a lever 58 to move said wedge member to and fro and thereby elevate the levers 52 and the supports 51. Between upper and lower anti-friction rollers 59 and 60 respectively, on said supports 51 is slidably mounted the aforenamed grid 50. This grid 50 is associated with the broiler pan 61 for vertical movement relatively thereto by upstanding members 62 at the rear of the pan 61 and these members have open ended slots 63 in which the rear of the grid is engaged in any desirable manner. When so engaged said grid is movable with the pan 61 horizontally with or vertically independently of the pan 61 by the means heretofore referred to.

The vertical movement of the broiler grid, it will be noted, is accomplished wholly independently of the position or movement of the pan 61; that is, the grid may be moved vertically during the movement or withdrawal horizontally of the pan; while the pan is withdrawn, or when the pan is in normal position within the broiler compartment, since the grid supports and the mechanism for effecting the vertical movement thereof, are assembled and co-operatively mounted on the side walls of the broiler compartment.

What I claim is:

1. In combination with an oven and a pivotally mounted door thereof, a plurality of superposed supports positioned adjacent the side walls of said oven, a plurality of independently operable means to raise and lower said supports, a slotted bar positioned adjacent to said supports, said bar having a cut-out communicating with the upper end of the slot therein, a plurality of pan carriers on said supports, each of said pan carriers at the rear thereof having connecting means extending into the slot of said bar, and the rear portion of the side of the upper pan carrier being inset away from said supports a distance greater than the thickness of said slotted bar, and means connecting the bar with the door for moving said pan carriers out of and back into the oven, the upper pan carrier remaining stationary during the movement of said bar when the connecting means thereof is in register with the cut-out in the slot of said bar.

2. In combination with an oven and a pivotally mounted door thereof, a plurality of superposed supports within the oven, separate means for raising and lowering said supports within the oven, the elements of said raising and lowering means being mounted on opposite side walls of said oven, pan carriers mounted on said supports and provided at the rear thereof with extensions, a pair of bars positioned in the oven adjacent to the walls thereof and formed with vertical slots, said bars having cut-outs extending from the upper portions of the upper slots through the rear faces thereof, the extensions on said pan carriers being positioned in the slots of said bars and the rear side portions of the upper pan carrier being inset away from said supports a distance greater than the thickness of said bars, and means pivoting in the side walls of said oven to suspend said bars, and mechanism connecting said pivoting means with the oven door, by which the bar is operated to project and retract said pan carriers together or to project only the lower pan carrier when the extensions on the upper pan carrier register with the cut-outs in the slots of said bars.

3. In combination with an oven, a pivotally mounted door for said oven, a plurality of pairs of supports, raising and lowering means for each pair of supports, said means being mounted on opposite side walls of said oven, a pan carrier mounted on each pair of supports and each of said pan carriers having lateral extensions at the rear thereof, and means for moving said pan carriers horizontally relative to said supports comprising vertical bars positioned in said oven adjacent each side wall thereof, said bars being provided with vertical slots in which the lateral extensions of said pan carriers are positioned, levers pivotally mounted on each side wall of said oven and suspending said bars, and link mechanism connecting said levers with said door.

4. In combination with an oven, a pivotally mounted door for said oven, a plurality of pairs of supports, raising and lowering means for each pair of said supports, said means being mounted on opposite side walls of said oven, a pan carrier mounted on each pair of supports, and each pan carrier having lateral extensions at the rear thereof, and means for moving said pan carriers horizontally relative to said supports comprising vertical bars positioned in the oven adjacent each side wall thereof, said bars being provided with vertical slots in which the lateral extensions of said pan carriers are positioned, and with cut-outs in the upper ends thereof extending through the rear faces thereof and the rear portion of the sides of one of the pan carriers being inset away from said supports to enable said vertical bars to move relatively thereto, levers pivotally mounted on each side wall of said oven and suspending said bars, and link mechanism connecting said levers with said door by which said bars are moved to project and retract said pan carriers simultaneously, or only one of said carriers when the extensions of the other carrier are in register with the cut-outs in said bars.

5. In combination with an oven and its pivotally mounted door, a pair of superposed supports within the oven, separate means for raising and lowering each pair of said supports, said means being mounted on opposite side walls of said oven, rollers on said supports, pan carriers on said rollers, said pan carriers being provided at the rear thereof with extensions and the rear sides of the upper pan carrier being inset away from its supports, vertical bars adjacent to each side wall of the oven, said bars being formed with a plurality of vertical slots and having a cut-out extending from the upper portion of the upper slot through the rear face thereof, the extensions on said pan carriers being positioned in the slots of said bars, levers pivotally mounted on the side walls of the oven to suspend said bars, and mechanism connecting said levers with said door by the opening and closing of which the pan carriers are projected and retracted together, or singly, when the extension of the upper pan carrier registers with the cut-out in said bars.

6. In combination with a broiler compartment of a stove, a pan withdrawably positioned within said compartment and provided at the rear thereof with upstanding members having open slots, a pair of supports adjacent the side walls of said compartment, rollers journaled on said supports, a broiler tray mounted on said rollers and connected at the rear with the slots in said upstanding members whereby said broiler tray is horizontally withdrawable with said pan and independently of said supports, and means pivoting on the side walls of said compartment and pivotally mounting said supports to raise and lower same and said tray independently of the pan.

ERNEST C. HILLMAN.